United States Patent
Goebel

[15] 3,650,697
[45] Mar. 21, 1972

[54] METHOD OF HYDROGEN PRODUCTION

[72] Inventor: Franz Goebel, Columbus, Ohio

[73] Assignee: Rand Development Corporation, Cleveland, Ohio

[22] Filed: Nov. 25, 1969

[21] Appl. No.: 879,791

[52] U.S. Cl. .................23/212 R, 23/150, 23/181, 23/210, 23/225, 252/466, 252/472
[51] Int. Cl. .................C01b 1/18, B01j 11/22
[58] Field of Search.............23/212, 210, 150, 185, 225; 252/466, 472

[56] References Cited

UNITED STATES PATENTS

| | | |
|---|---|---|
| 3,340,011 | 9/1967 | Hoekstra et al..........................23/212 |
| 3,425,959 | 2/1969 | Haddad..............................252/466 X |
| 3,448,060 | 6/1969 | Mason....................................252/466 |
| 3,454,364 | 7/1969 | Sturm et al. ............................23/212 |
| 3,457,192 | 7/1969 | Housset et al........................23/212 X |

Primary Examiner—Edward Stern
Attorney—Baldwin, Egan, Walling & Fetzer

[57] ABSTRACT

A process for the production of hydrogen from a hydrocarbon, and more particularly methane, by the reaction of the hydrocarbon with steam in the presence of a catalyst. The catalyst consists essentially of a mixture of activated Raney nickel, iron, activated Raney cobalt, zirconium and aluminum. The catalyst may be used in a 50—50 mixture of quartz sand or alumina and catalyst. The process is carried out at a relatively low temperature of between approximately 300° to 550° C.

9 Claims, 1 Drawing Figure

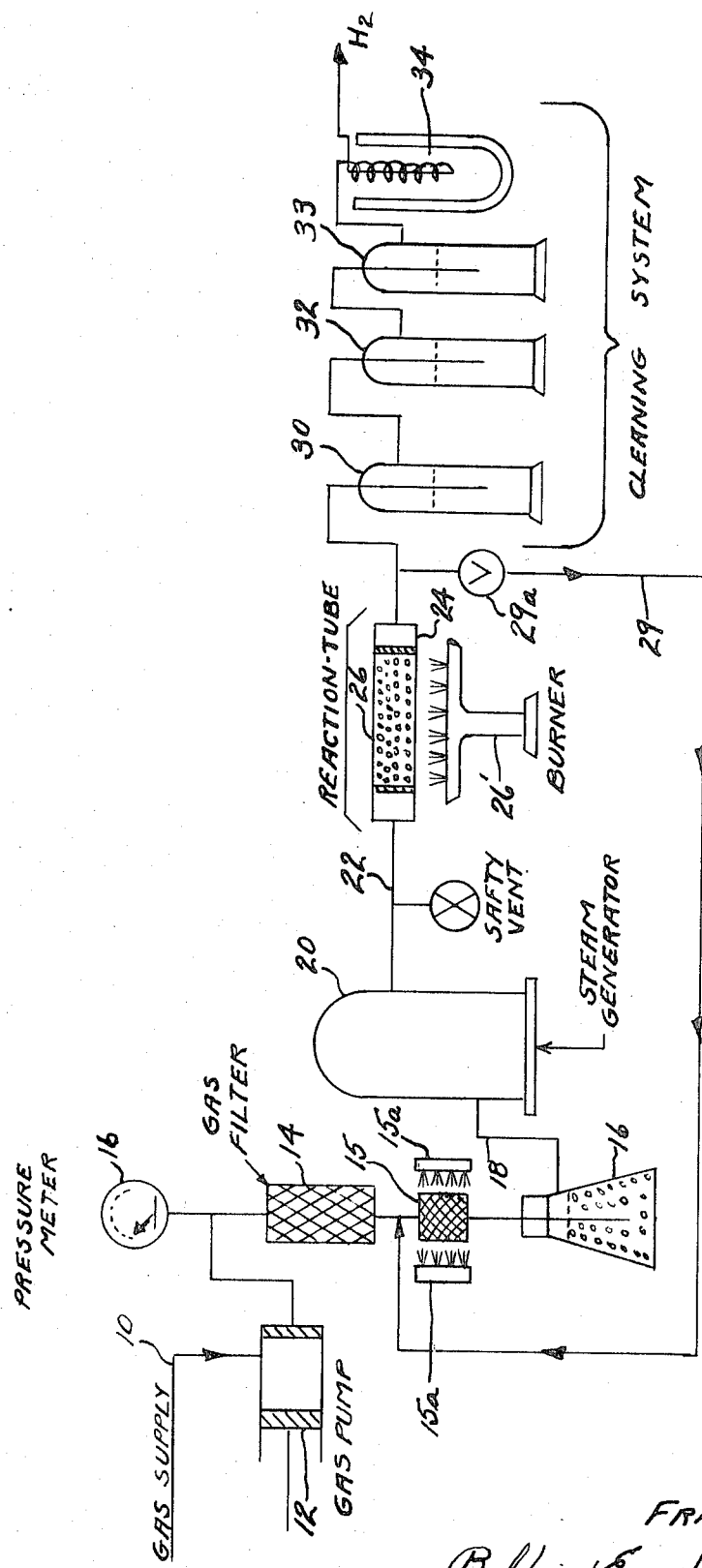

3,650,697

METHOD OF HYDROGEN PRODUCTION

This invention relates to a process for the generation of hydrogen or hydrogen containing gas mixtures by the catalytic conversion of a gaseous hydrocarbon in the presence of steam, and at relatively low temperatures.

BACKGROUND OF THE INVENTION

Hydrocarbon gases, such as methane, available in connection with petroleum processing, represent a substantial source of hydrogen and various processes have been promoted to convert such hydrocarbons to hydrogen. U.S. Pat. No. 3,379,504 issued Apr. 23, 1968 to John C. Hayes, describes one such process. The decomposition of the methane to hydrogen has been effected at high temperature conditions in the presence of steam and a catalyst of the iron group metals. Such temperatures generally are found in the range of between approximately 800° to 1,000° C.

SUMMARY OF THE INVENTION

The present invention provides a process for the decomposition of gaseous hydrocarbons and more particularly methane, to hydrogen, and at relatively low temperatures, such as for instance in the range of 300° to 550° C. and using a novel composition of catalyst.

Accordingly, an object of the invention is to provide a novel process for the production of hydrogen from gaseous hydrocarbons.

Another object of the invention is to provide a novel process for the production of hydrogen from gaseous hydrocarbons and more particularly methane, and at a relatively low reaction temperature of approximately 300° to 550° C.

Another object of the invention is to provide a novel process for the production of hydrogen from low molecular weight gaseous hydrocarbons with the conversion of the hydrocarbons with steam in the presence of a novel catalyst and at a relatively low reducing temperature such as for instance, within the range of 300° to 550° C., and wherein the catalyst comprises a promoter in combination with various other elements and particularly iron, nickel and cobalt, to effect the decomposition of the hydrocarbon to hydrogen.

A still further object of the invention is to provide a novel process of the above indicated type wherein the cobalt and the nickel in the catalyst consists of activated Raney cobalt and activated Raney nickel respectively, and with the catalyst including predetermined percentages by weight of zirconium and aluminum.

A still further object of the invention is to provide a process of the latter disclosed type wherein the catalyst and quartz sand or alumina are uniformly combined in a 50—50 mixture by weight for providing a reactor bed through which the hydrocarbon and steam passes to be converted to hydrogen.

A still further object of the invention is to provide a process of the aforediscussed type wherein the catalyst includes a promoter for stimulating the reduction of the methane by the catalyst.

Other objects and advantages of the invention will be apparent from the following description taken in conjunction with the accompanying drawings wherein:

BRIEF DESCRIPTION OF THE DRAWINGS

The FIGURE is a simplified flow diagram of apparatus in an organized system for practicing the invention.

DESCRIPTION OF THE PREFERRED EMBODIMENTS

Referring now again to the drawings, a supply of gas 10 and more particularly methane, is pressurized as by means of a gas pump 12, thus causing the gas to flow through a gas filter mechanism 14. The gas is preferably maintained at a pressure as measured by gage 16 of approximately one atmosphere or less, as for example 4 to 8 p.s.i.g., but a pressure within a range of up to and including approximately 3 atmospheres is satisfactory. Filter 14 preferably comprises an activated charcoal filter of conventional type, many of which are known in the art, adapted especially for removing sulphur from the gaseous hydrocarbon methane. The filtered gaseous hydrocarbon stream is then preferably passed through a bed 15 of reduced iron which is preferable maintained as by heating means 15a at a temperature of approximately 250° C. The bed 15 may be of 300 mesh or finer, as measured on the U.S. Standard Seive Series. The gas stream emitting from bed 15 is then passed through a bath 16 of a 3–5 normal solution of ammonium hydroxide, the latter being at room temperature. The gas stream is then transmitted via line 18 to steam generator 20 where the filtered gas stream is mixed with steam. The mixture of hydrocarbon gas and steam in a ratio of approximately 2 molar volumes of steam per molar volumes of methane gas is then passed from the steam generator 20 via line 22 to the reactor tube 24 which is heated by any suitable means such as for instance gas burner jets 26', whereby the bed 26 is maintained at a temperature of preferably approximately 300° to 550° C. maximum.

Reactor tube 24 in the embodiment illustrated is approximately 1 inch in internal diameter and contains a novel catalyst for the decomposition of the hydrocarbon gas to hydrogen gas. The bed 26 in the reactor 24 preferably comprises a mixture of quartz sand or alumina and a catalyst composition of granular or particle form consisting of a uniform mixture of approximately 30 to 40 parts by weight of activated Raney nickel, approximately 20 parts of iron, approximately 20 parts of activated Raney cobalt, and a maximum of 10 parts each of zirconium and aluminum. The ratio of quartz or alumina in particle form to the catalyst composition is preferably approximately 50 percent quartz or alumina to 50 percent catalyst composition by weight. The activated nickel and cobalt are preferably 350 mesh or even finer as measured on the U.S. Standard Seive Series. The iron is preferably hematite ore of approximately 250 to 300 mesh as measured on the U.S. Standard Seive Series, and the aluminum and zirconium metals are preferably of approximately 250 to 300 mesh as measured on the U.S. Standard Seive Series. The catalyst composition is preferably uniformly mixed with the quartz sand or alumina particles for providing the bed of catalyst material. The sand granules may be within a size range of approximately 1 to 2 millimeters in diameter and the alumina particles may be of approximately one-half to 1 millimeters in diameter, to obtain the desired porosity of the bed, and the bed may be approximately 3 to 5 inches in length in the system illustrated.

The catalyst composition may also have included therewith a promoter which is preferably nickel-boride ($Ni_2B$). This is preferably added in an amount within a range of approximately 1 to 1.5 parts by weight.

The gas flow emitting from filter 14 may still have sulfur combined therewith and therefore a takeoff line 29 may be provided downstream from bed 26 for bleeding off a quantity of hydrogen gas and passing it back into the gas flow upstream from bed 15. This hydrogen gas will combine with the sulfur to form hydrogen sulfide. Valve 29a may be provided in line 29 for controlling the quantity of hydrogen feedback into the methane flow, and such quantity should be adequate so as to convert all of the sulfur to hydrogen sulfide.

The gas flow of hydrogen coming from reactor 24 will probably have some hydrogen sulfide combined therewith as above discussed, and may have some carbon dioxide, and thus is directed into a cleaning system comprising a first stage 30 of a water bath and a second stage 32 of a 3–5 normal solution of ammonium hydroxide, and a third stage 33 of a 3–6 normal solution of potassium hydroxide, through which the gas passes. The gas flow from the cleaning system 30, 32, 33 is then directed to a cooling coil 34 and thence to a storage tank (not shown) or directly to an area of use. The conversion percentage of methane to hydrogen utilizing the process of the invention is approximately 100 percent.

In prior art arrangements utilizing steam in conjunction with a catalytic bed for converting methane to hydrogen, much higher temperatures were required, such as for instance, from 800° to 1,000° C. With the present arrangement of low temperature conversion, a much more economical process for the production of hydrogen is provided.

From the foregoing discussion and accompanying drawings it will be seen that the invention provides a novel process for the production of hydrogen and at a relatively low reaction temperature as compared to prior art practice. The invention also provides a novel composition of catalyst bed, and a process resulting in the effective and efficient production of hydrogen gas from gaseous hydrocarbons, such as methane.

The terms and expressions which have been used are used as terms of description and not of limitation, and there is no intention in the use of such terms and expressions of excluding any equivalents of any of the features shown or described or portions thereof, and it is recognized that various modifications are possible within the scope of the terms and expressions utilized to describe the invention.

What is claimed is:

1. A process for the production of hydrogen from a gaseous saturated hydrocarbon maintained at superatmospheric pressure which comprises reacting at least approximately 2 molar volumes of steam per molar volume of methane at a temperature of between approximately 300° to 550° C. in the presence of a finely divided catalyst, said catalyst consisting essentially of a uniform mixture of by weight between approximately 30 to 40 parts of activated Raney nickel, approximately 20 parts of $Fe_2O_3$ iron ore, approximately 20 parts of activated Raney cobalt, a maximum of approximately 10 parts of elemental zirconium, and a maximum of approximately 10 parts of elemental aluminum.

2. The process in accordance with claim 1 wherein said nickel and said cobalt are approximately 350 mesh or finer as measured on the U.S. Standard Seive Series, said iron ore is of approximately 250 to 300 mesh or finer as measured on the U.S. Standard Seive Series, and said zirconium and said aluminum are approximately 250 to 300 mesh or finer as measured on the U.S. Standard Seive series.

3. A process in accordance with claim 1 wherein said catalyst is mixed with an equal amount by weight of quartz sand.

4. A process in accordance with claim 1 wherein said catalyst is mixed with an equal amount by weight of alumina in particle form.

5. A process in accordance with claim 1 wherein the catalyst contains a promoter in an amount of approximately 1 to 1.5 parts by weight of nickel boride.

6. A process in accordance with claim 1 including the step of passing the hydrocarbon through a bed of charcoal to filter out sulphur and other impurities in said hydrocarbon prior to exposing the hydrocarbon to the steam and catalyst.

7. A process in accordance with claim 1 wherein approximately 100 percent of the hydrocarbon is converted into hydrogen.

8. A process in accordance with claim 1 including the step of introducing hydrogen into the gas stream prior to exposing the latter to the steam and catalyst, for combining with any sulfur in the gas stream to form hydrogen sulfide.

9. A process in accordance with claim 1 wherein the gas stream is passed through a cleaning system after being exposed to the steam and catalyst, said cleaning system including a water bath stage, and a stage of ammonium hydroxide solution and a stage of potassium hydroxide solution for cleaning any hydrogen sulfide and carbon dioxide from the gas stream.

* * * * *